Feb. 21, 1950 — R. W. DE LANCEY — 2,498,362
CONVECTION AND FORCED DRAFT AIR FLOW
AND COMBUSTION AIR HEATING FURNACE
Filed Nov. 13, 1943
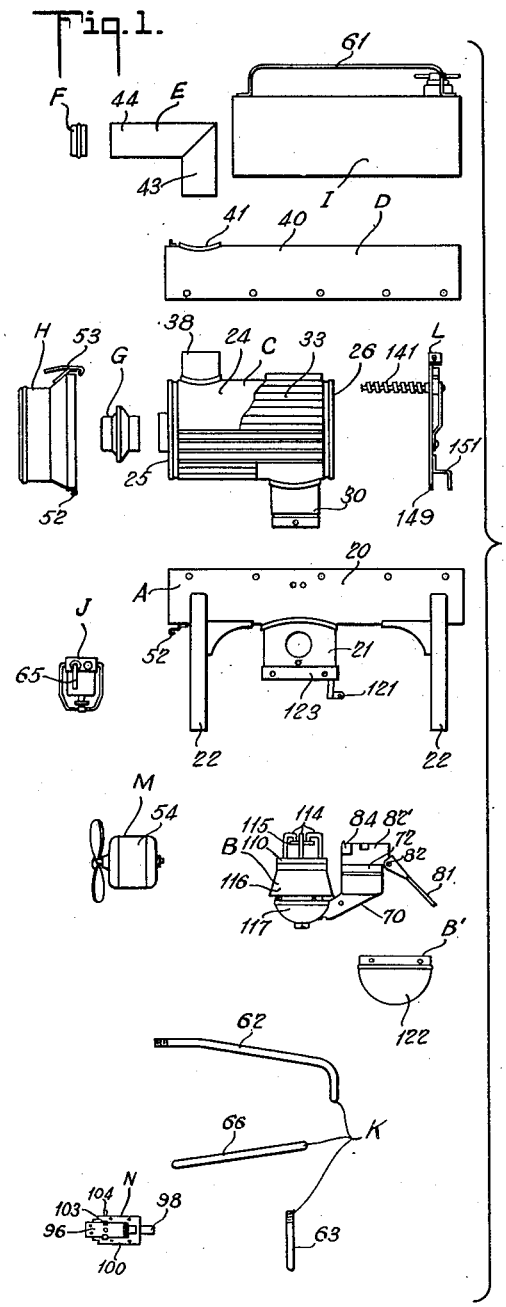
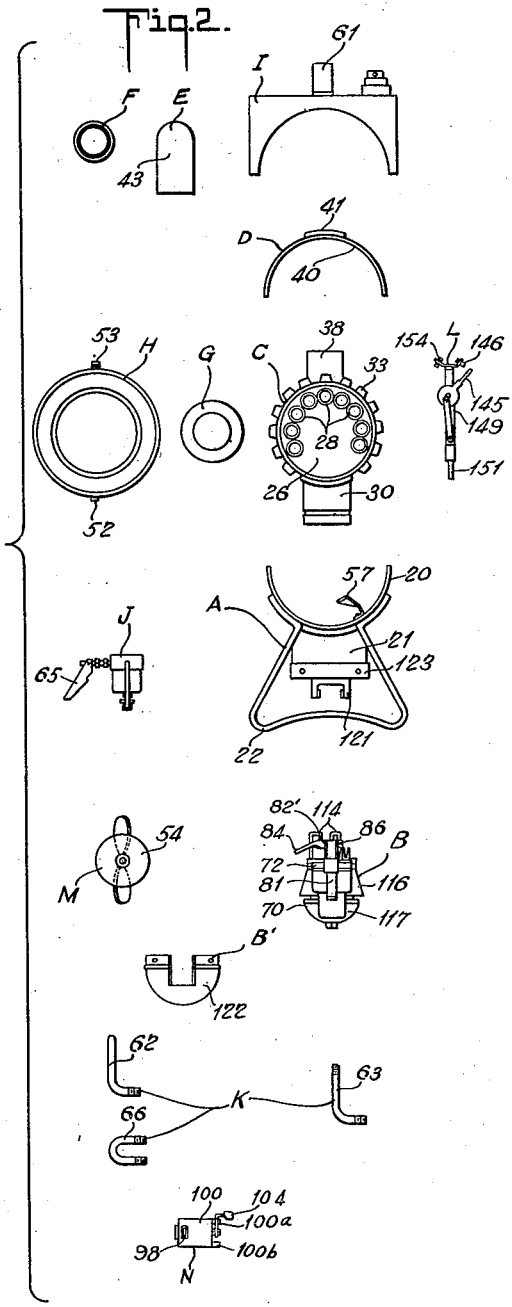
INVENTOR
RALPH W. DELANCEY
BY
ATTORNEY

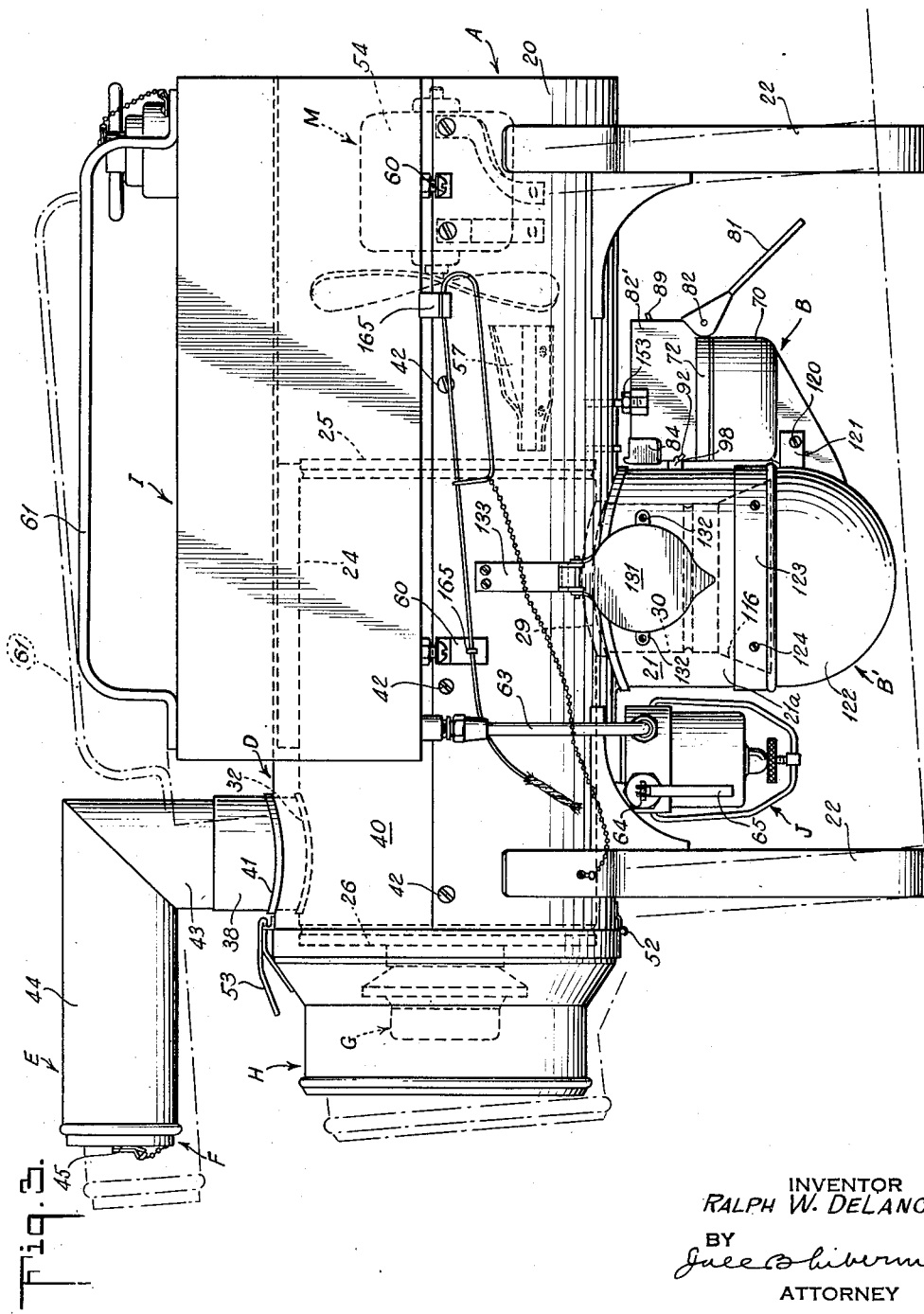

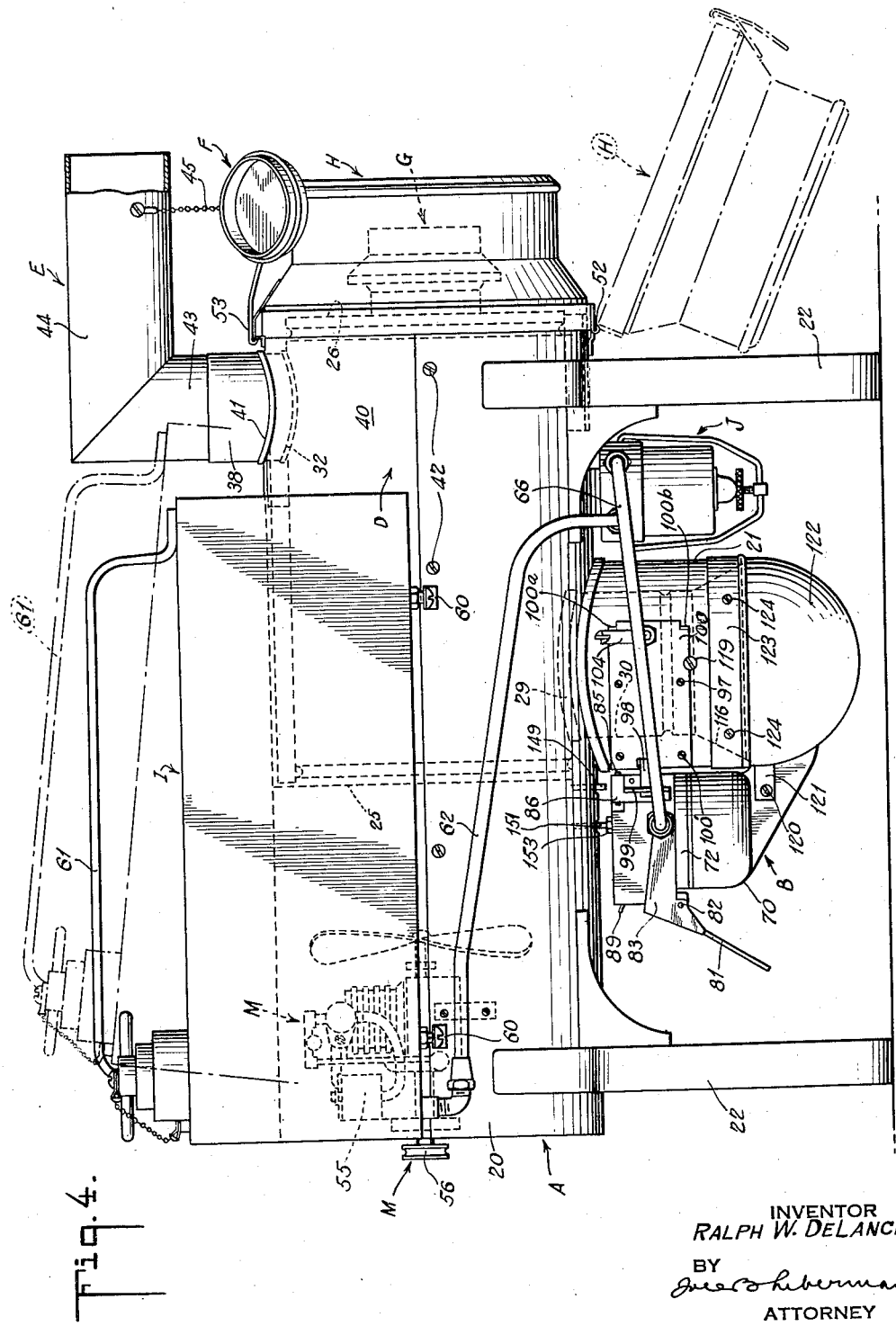

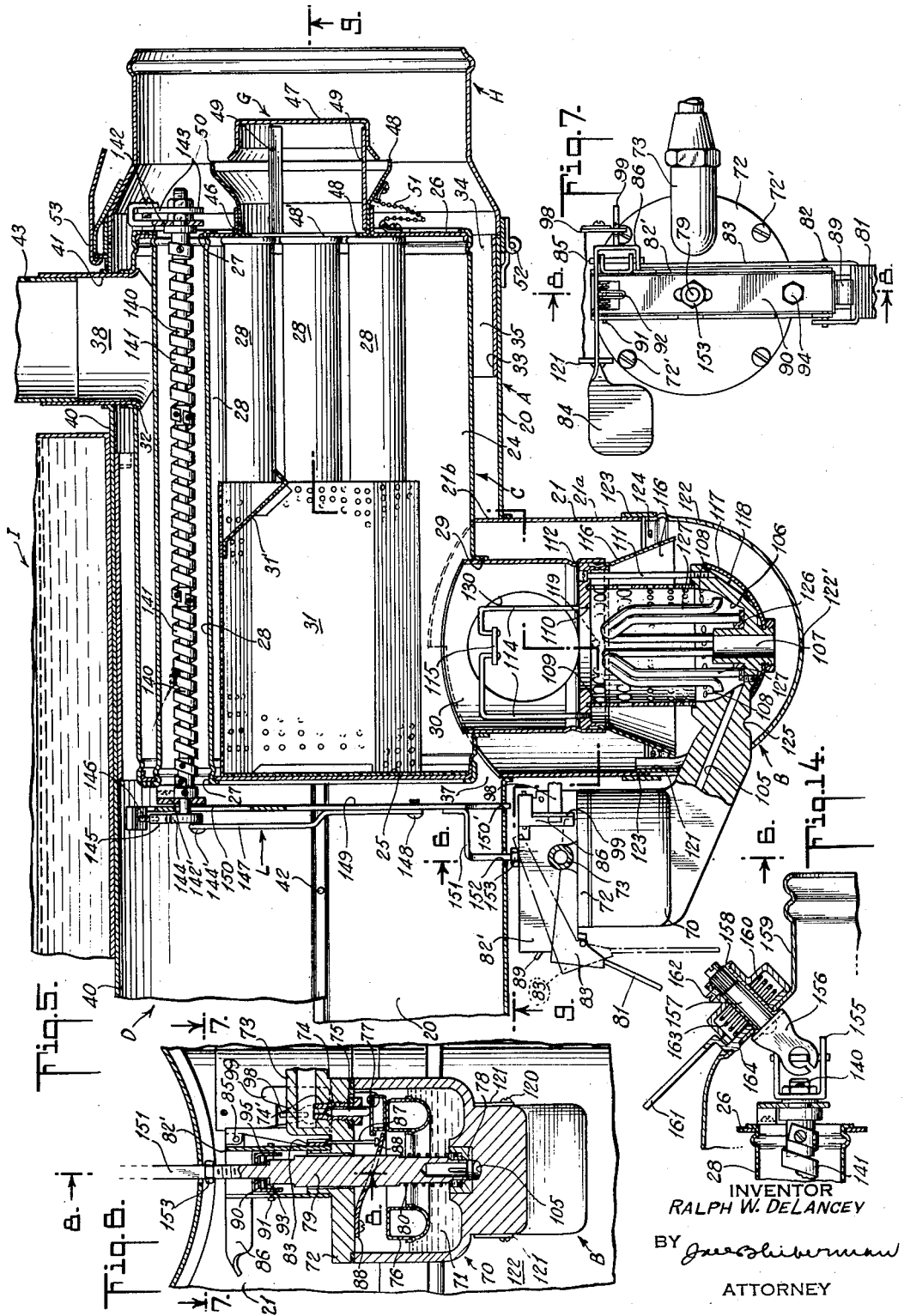

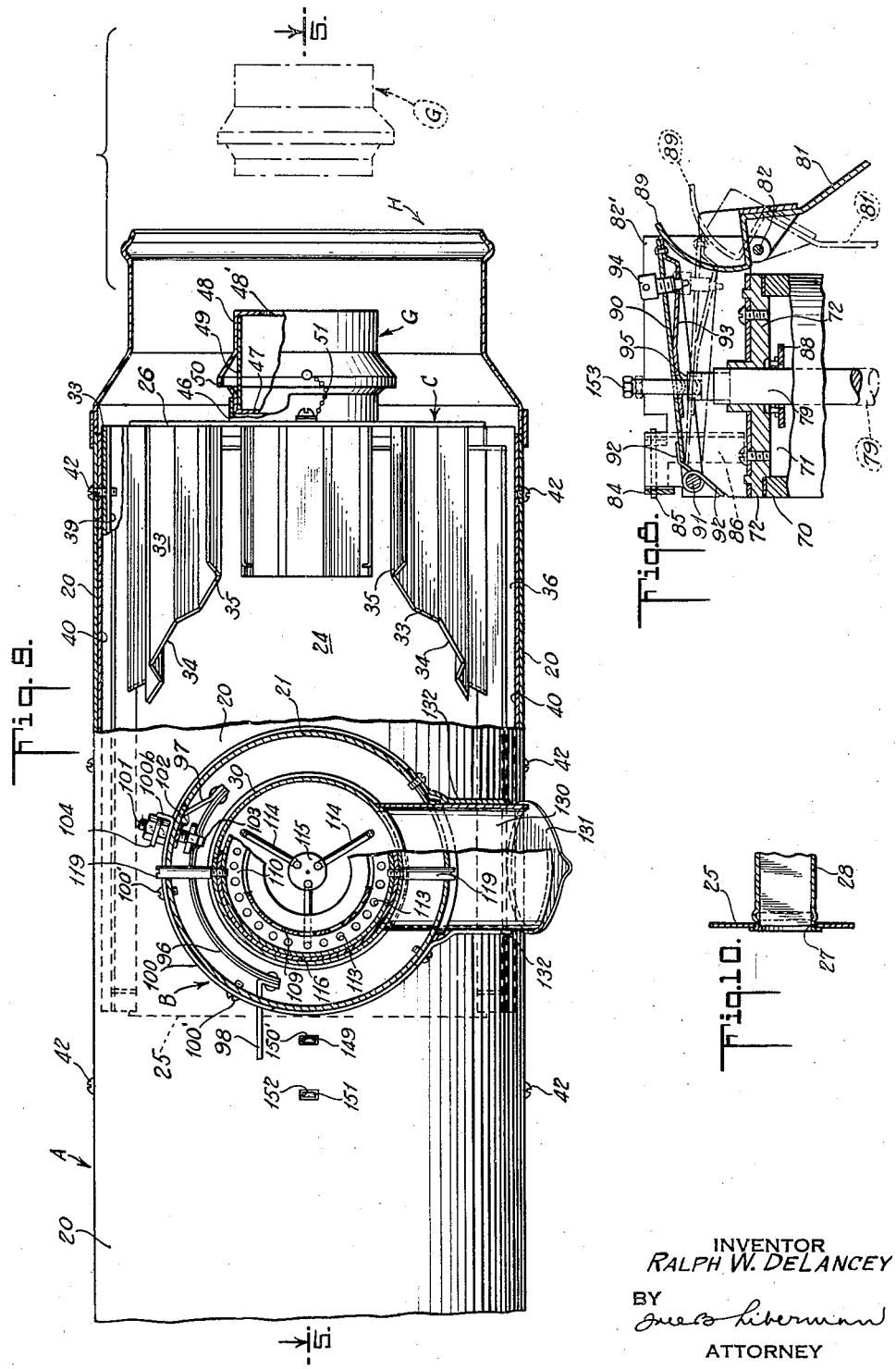

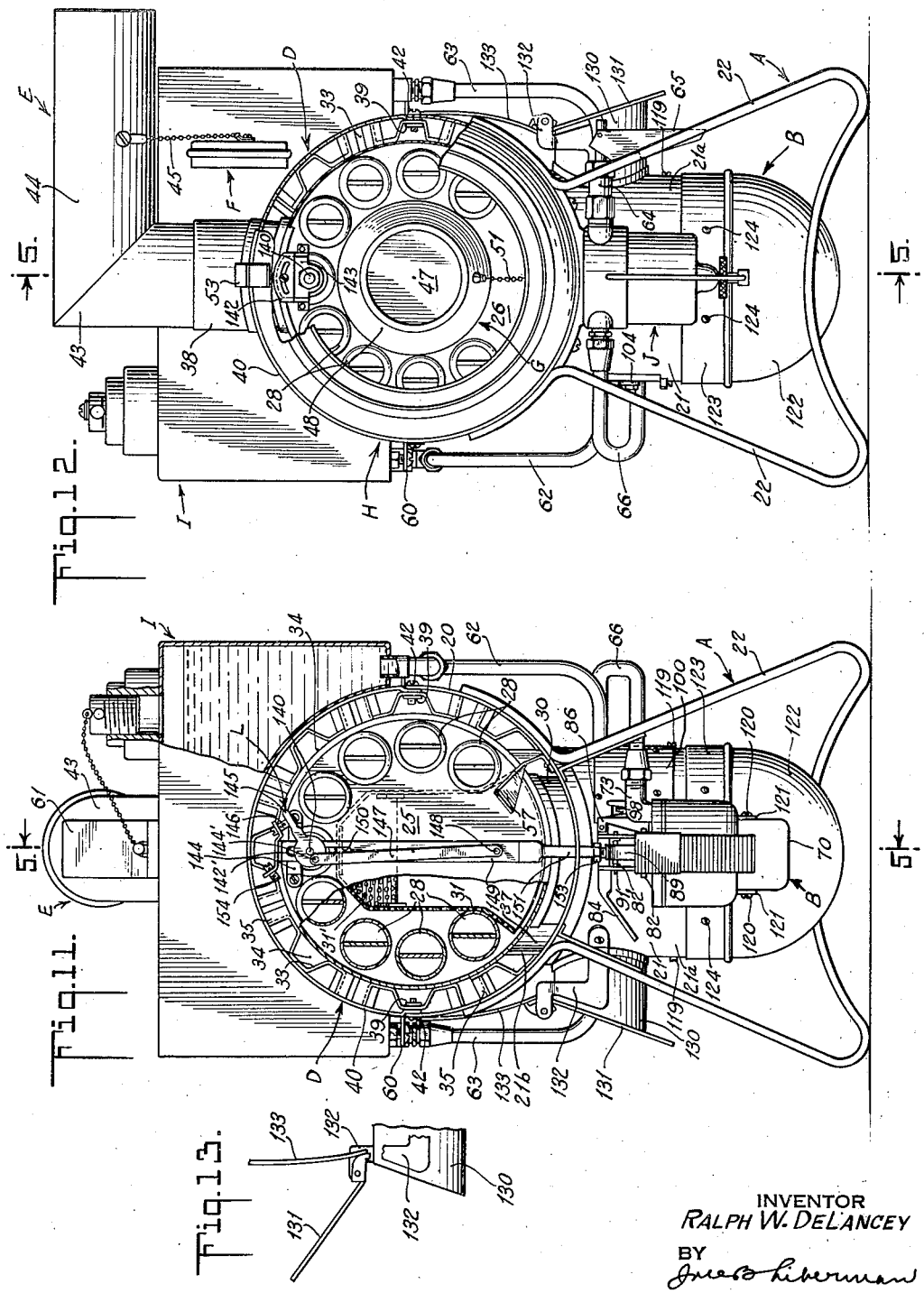

Patented Feb. 21, 1950

2,498,362

UNITED STATES PATENT OFFICE 2,498,362

CONVECTION AND FORCED DRAFT AIR FLOW AND COMBUSTION AIR HEATING FURNACE

Ralph W. De Lancey, Meriden, Conn., assignor to The Miller Company, Meriden, Conn., a corporation of Connecticut Application November 13, 1943, Serial No. 510,181

10 Claims. (Cl. 126—110)

The present invention relates to warm air heating furnaces and is more particularly directed toward portable warm air furnaces.

Extremely cold weather, such as 40 degrees below zero Fahrenheit, and colder, is found during the winter in very cold climates, and this temperature is so low as to call for auxiliary heating to make it possible to start automotive equipment, such as automobiles, trucks, tanks, tractors, airplane engines and the like, and the present invention is more especially directed toward warm air heaters which are suitable for heating such equipment to a sufficient amount to make it possible to start the equipment in the same manner as during warm weather. At low temperatures, such as referred to, lubricating oils and greases are extremely stiff and batteries are very weak, so that ordinary cranking methods cannot be employed. Furthermore, highly volatile fuels give off so little vapor as to be incapable of being ignited by the ignition systems ordinarily used on such equipment.

According to the present invention a comparatively small portable heater which can burn gasoline, Diesel fuel oil, or lighter heating oils, is employed to heat a blast of air which is blown on to the equipment to be warmed. Where electric power is available for operating an electric motor, the blower for air may be operated by an electric motor. Where, however, electric power is not available (and at these low temperatures battery power is not satisfactory) a small internal combustion engine may be employed. Inasmuch as such engines will not start at such low temperatures, preliminary heating is necessary and to accomplish this the present invention contemplates that the fuel will be ignited from a torch (lighted by a match) and the burner operated under natural draft conditions for a time sufficient to warm the burner and the small internal combustion engine, and then the operation of the burner is changed from natural draft operation to forced draft operation as soon as the blower can be started.

While some heating applications, such as the warming of automotive equipment can be carried out by the use of contaminated hot air, other heating operations such, for example, as the heating of compartments occupied by personnel, such as cabs and trailers, must be carried out by pure fresh air, and the present invention contemplates providing the hot air furnace with suitable means whereby pure uncontaminated air may be delivered or whereby the air delivered contains the products of combustion as well as the air blown through the furnace by the fan. This contaminated air will, of course, deliver a much greater heat output than that available with uncontaminated air only.

At extremely low temperatures it is necessary for the operator to avoid exposing his hands as much as possible and avoid contact of the bare hands with exposed parts. According to the present invention, the controls for the furnace are designed so that every manipulation necessary in getting the burner into operation can be done by the mittened hand, except for the striking of the match to ignite the torch. This makes it possible for the operator to do all the manipulations necessary except for the mere lighting of the match while keeping on his mittens.

In the more usual types of construction wherein oil is burned in vaporizing type burners, it is very important that the burner and parts associated with it be very carefully levelled. According to the present invention, however, the burner and associated controls are constructed in such a manner that levelling of the burner is not required and as a matter of fact the entire furnace and associated burner operate entirely satisfactorily at very substantial angles of tilt in any direction. This makes it possible to operate the burner and furnace when considerably out of level and when on a vehicle in motion over rough terrain.

While the hot air furnace shown and described herein in detail is more especially suitable for use under the conditions above referred to, it is suitable for use in small stationary hot air heaters, mobile heaters, portable heaters, dehydrators, and the like with or without changes necessary or desirable for particular uses.

Other and further objects will appear as the description proceeds.

The accompanying drawings show for purposes of illustrating the present invention an embodiment in which the invention may take form, together with modifications of certain parts, it being understood that the drawings are illustrative of the invention rather than limiting the same.

In these drawings:

Figure 1 is a diagrammatic exploded view illustrating sub-assemblies for the complete furnace, the subordinate views being taken from the front side of the furnace;

Figure 2 is an exploded view similar to Figure 1, but with the subordinate views taken from the right hand end of the furnace parts, as viewed in Figure 1;

Figure 3 is a front side elevational view of the hot air furnace arranged for delivering contaminated air and showing the controls (all of which are in the normal running position), also the use of an electric motor operated blower;

Figure 4 is a side elevational view taken opposite to the view of Figure 3 and showing the furnace arranged for delivering pure fresh air and with an internal combustion engine driven fan;

Figure 5 is a longitudinal sectional view taken in the same direction as Figure 4, and on the vertical center line 5—5 of Figures 9, 11 and 12, the parts being arranged for delivering contaminated air;

Figure 6 is a transverse vertical sectional view on the line 6—6 of Figure 5 looking in the direction of the arrows and showing the constant level valve, the metering valve and associated controls, all in the normal running position;

Figure 7 is a plan view taken in the direction of the arrows 7 of Figure 6;

Figure 8 is a sectional view on the line 8—8 of Figures 6 and 7, the parts being indicated in the shut down position by dotted lines;

Figure 9 is an inverted plan view with parts broken away to show interior construction and parts in section on the line 9—9 of Figure 5;

Figure 10 is a fragmentary view illustrating a detail of the combustion drum and air tubes;

Figure 11 is an elevational view taken from the right of Figure 3 and the left of Figures 4 and 5 with parts broken away to show interior construction, the air temperature responsive thermostat being cold;

Figure 12 is an end elevational view taken from the right of Figure 4 with parts broken away to show interior construction and the furnace arragned to deliver pure heated air;

Figure 13 is a fragmentary view showing the lighting door open; and

Figure 14 is a fragmentary sectional view showing a modified form of thermostat adjustment.

Reference is first made to Figures 1 and 2, which diagrammatically show the sub-assemblies for a complete portable hot air furnace, designed for heating automotive equipment. The bottom housing unit is shown at A. The combined fuel burner constant level valve-metering valve and valve control unit is shown at B. This latter unit is mounted under the bottom housing and in turn carries a bottom closure cup B'. The combustion drum C is received in the bottom housing A and covered by the top housing D. The stack for the discharge of products of combustion from the combustion drum is indicated at E and the cap by which the stack may be closed off is indicated at F. A plug by which the left end of the combustion drum C may be closed or opened is indicated at G, and a discharge or air delivery cover is indicated at H. The fuel supply tank carried on top of the top housing is indicated at I; the strainer at J, and the pipes for interconnecting the fuel tank with strainer and the strainer with the constant level valve at K. The air temperature responsive thermostat for controlling the metering valve is shown at L, the blower at M and the bimetallic safety at N. Some of the smaller parts employed in assembling the furnace are omitted from Figures 1 and 2.

The bottom housing unit A has a semi-cylindrical bottom housing member 20, to which is welded a tubular burner housing 21. This burner housing tube extends below the bottom housing member 20 as indicated at 21a, Figure 5, and above it as indicated at 21b. The unit A also has legs 22 for support.

The combustion drum C has an outer cylindrical body 24, and end walls 25 and 26. These end walls have aligned openings 27, which receive air tubes 28. The bottom part of the drum body 24 is provided with an opening 29 in which is welded a downward extending fire tube 30. It will be noted from the drawings that this fire tube is near one end of the combustion drum and that the lower air tubes 28 are spaced apart substantially the same distance as the diameter of the fire tube 30. The adjacent wall 25 of the combustion chamber supports an inverted box-like baffle 31, made of perforated sheet metal and shown more clearly in Figures 5 and 11. This perforated baffle protects the adjacent ends of the air tubes 28 from direct impingement of the flame and yet permits the heat to pass out about these air tubes. The baffle 31 has a downwardly sloping cross baffle 31' which compels most of the heated air to pass out underneath it. The combustion drum is provided with a stack opening 32 at the top and at the end opposite the fire tube 30. The outside of the combustion drum is provided with sheet metal strips 33, to provide air passages 34 and fins 35. The combustion drum C can be completely assembled and lowered into position in the bottom housing A with the fire tube 30 concentric with the tubular burner housing 21, and then the lower strips 33 will engage the inner surface of the bottom housing member 20 to provide longitudinally extending air passages in the space between the combustion drum and the bottom housing. The upper edge of the tube 21 engages the lower surface of the drum 24 in the side away from the end wall 25 so as to provide an opening 37 for supplying air to the burner. A short tube 38 is welded into the stack opening 32. The strips 33 which extend along the center of the drum are provided with reinforcing bars 39, 39, see Figures 9, 11 and 12.

The top housing unit D has a semi-cylindrical top housing member 40, similar to the bottom housing member 20, but provided with an opening 41 over the stack tube 38. The top housing member 40 fits over the top of the combustion drum and the top and bottom housing members are secured together by screws 42 threaded into the bars 39. The strips 33 provide similar air passages between the drum and top of the housing.

The stack E may assume various forms, but a convenient form is shown in the drawings as consisting of a vertical tubular element 43 and horizontal tubular element 44, these being welded together. The vertical part of the stack may telescope down into stack tube 38, so that the stack may be turned to discharge products of combustion in various directions. The cap F for the stack merely fits on the outer end of the stack and may either be placed in the stack or hung free by means of the chain 45 shown.

When the cap is in the position indicated in Figures 4 and 12, the products of combustion pass out through the stack, but when it is in the position indicated in Figure 3 products of combustion do not pass out through the stack. In order to permit the products of combustion to escape from the drum without going up the stack, the end wall 26 of the drum is provided with flanged opening 46 adapted to receive and support the plug G. This plug element comprises a cup shaped stamping 47, having a closed end wall and a stamping 48 having a large central opening 48', these stampings being held together by straps 49. The stamping 48 has an outwardly flared rim 50. When the plug is in the position shown in Figures 4, 9 and 12, the cup shaped stamping 47 is inserted into the opening 46 in the end wall of the combustion drum and compels the products of combustion to go up through the open stack. When, however, the plug G is withdrawn and reinserted with the stamping 48 held in place in the flanged opening 46, as shown in Figure 5, the products of combustion may pass through the hole in the stamping 48 and enter the plug. This plug acts differently than would a mere damper, for the plug intercepts sparks so that they cannot pass out into the hot air stream, and it also prevents back pressure choking off the escape of the products of combustion. Also the gases do not pass directly through the plug but instead escape out through the space provided by the enlarged rim 50 of the stamping 48 and therefore are diffused into the air blown out through the tubes 28. In order to prevent loss of the plug, it is secured to the combustion drum by a chain 51.

The air delivery cover H shown herein is one adapted to receive a duct, usually of fabric, for conducting air to the region to be heated. It is shown as a cylindrical sheet metal device hinged at 52 and provided with a catch 53. It serves to receive the air blown through the combustion drum and the space between the combustion drum and the housing, as well as the contaminated air when the plug G and the cap F are in proper position for delivering contaminated air.

In the form shown in Figures 1 through 12, the cover member H can be lowered about the hinge as shown in drawings. A modified form of cover is illustrated in Figure 14 and will be later described.

In order to provide a blast of air through the furnace the open rear end of the housing accommodates a blower M which may be either an electric motor and fan as indicated at 54, Figure 3, or an internal combustion engine and fan as indicated at 55 in Figure 4. The fuel for the engine may be obtained from a small tank forming part of the engine unit, as indicated, or from the burner supply tank I where gasoline is used as a fuel. Where the latter is used a starting pulley 56 is placed beyond the end of the housing. The blower unit not only blows air through the tubes 28 to be heated, but also causes a blast of air to pass down through the space between the fire tube 30, and the tubular burner housing 21 to supply the burner. A deflector 57 is employed to guide a portion of the blast of air from the fan into this down draft passage.

The fuel supply tank I is shaped to be mounted on top of the housing and as here shown extends from the rear end of the housing nearly to the stack. It extends about the sides of the top of the housing and is suitably secured to brackets 60 carried by the housing. The tank is provided with a handle 61 by which the entire furnace can be carried. The liquid fuel carried in this tank is delivered to the strainer J through pipes 62 and 63. These two pipes are connected to the diagonally opposite corners of the tank, so that fuel can be drained from the tank when the furnace is substantially out of level.

The strainer J may be of conventional construction and may be secured in any convenient way to the bottom of the housing. It carries a shut off valve 64, biased to closed position and operable to an open position by a lever 65. The discharge pipe from the strainer is indicated at 66 and it leads into the fuel control valve formed in part of the burner control valve unit B.

The body casting of the burner valve control unit B is designated by the reference character 70. It has a float chamber 71 which is closed off by a cover 72, fastened in place by screws 72'. The cover has a rearwardly extending tubular coupling element 73 for coupling to the fuel line 66. A valve seat member 74 is threaded up into a drilling 74' in the cover member 72 and this valve seat member 74 receives a valve pin 75 which is normally controlled by a float 76 hinged at 77. When the parts are in the position shown in Figure 6 the float 76 and float control valve 75 operate similarly to the float valve in an automobile engine carburetor and maintain a predetermined supply of fuel in the float chamber 71. The casting 70 is provided with an outlet valve seat insert 78 at the bottom of the float chamber, which cooperates with a metering valve stem 79 urged upwardly by a spring 80 and downwardly by mechanisms to be described. This valve forms the metering valve for the burner.

The constant level valve and metering valve are under manual control for the purpose of starting and stopping the burner and are under automatic control for the purpose of emergency shutdown of the burner as well as for the continuous control of the metering valve for normal continuous operation. These form the subject matter of my applications Serial Nos. 510,183 and 510,184, respectively, filed concurrently herewith, which have been issued as Patents No. 2,447,902, dated August 24, 1948, and No. 2,428,867, dated October 14, 1947, respectively. These controls will now be described.

The starting lever for opening the fuel line into the fuel chamber 71 is shown at 81. It is pivoted at 82 to the U-shaped stamping 82' carried by the cover member and has a general horizontally extending arm 83, which overlies the top of the cover member 72. When it is in the position shown in Figures 3 to 8 and 11, the inner end of this arm 83 is latched in this position by a lever 84 pivoted at 85 to the stamping 82' and having a rear extension 86.

When the starting lever 81 is latched in this normal operating position, the arm 92 presses down on a pin 87 which extends through the float chamber cover 72 and normally rests on the top of a leaf spring 88. This leaf spring is carried by the under side of the cover 72 and is normally urged upwardly. It is arranged as shown in Figure 6 to be free of the float mechanism when in that position, but when the starting lever 81 is in the shut off position, as indicated in dot and dash lines in Figures 5 and 8, the pressure on the leaf spring 88 is removed and this spring is able to act on the float mechanism, so as to move it into the position to move the valve 75 to closed position and at the same time it will lock the float mechanism against vibration during shipment or transportation of the burner.

The starting lever 81 has a cam 89 (see Figure 8) adapted to act on a lever 90 pivoted to the stamping 82' at 91 and urged downwardly by a coiled spring 92. The lever 90 carries a leaf spring 93 whose position can be adjusted by high fire adjustment screw 94. The free end of the spring 93 extends above shoulder 95 on the valve stem 19 and, as shown in full lines in Figure 8, is out of contact with this shoulder when the parts are in starting position. The spring 93, however, limits the height to which the metering valve stem may be moved by the coiled spring 80.

As there is the hazard of blower failure, or of choking off of the draft by simultaneously closing the stack and the delivery end of the combustion chamber, or by the stoppage of delivery of contaminated air from the furnace, there is the possibility of continuation of burner operation without proper draft which would bring about overheating near the burner and sooting of passages. To avoid such operation the furnace is provided with the bimetallic safety N having a thermostat 96 supported from a bracket 97 in the space between tubes 21 and 30, and having an extension 98 engaging notched element 99 on the rear of latch lever 84. The bracket 97 is part of a plate 100 held in place on tube 30 by screws 100'. A shaft 101 threaded into bushing 102 is provided with a yoke 103 to receive the bimetallic member 96 and a handle 104 by which the thermostat may be adjusted to respond to dangerous temperature rises above varying ambient temperatures—such as –45° F. or room temperature. Suitable stops 100a and 100b limit the movement of handle 104. On overheating the thermostat 96 expands and releases the starting lever 81 causing the float valve and metering valve to close.

When the starting lever 81 is shifted to open the valves and the furnace is cold, the metering valve will open to an extent determined by the air temperature control unit L in a manner to be described below. The fuel will then be allowed to flow through the metering valve at a predetermined rate which is the proper rate, (more than pilot and less than maximum fire), for starting the burner. The fuel will pass down a sloping passage 105, see Figure 5, and enter the vaporizer 106, forming the other end of the body 70 of the burner unit B. The burner construction which forms the subject matter of concurrently filed application Serial No. 510,182, which has been issued as Patent No. 2,432,143, dated December 9, 1947, will now be briefly described.

The vaporizer 106 has a central air tube 107 and a row of downwardly and inwardly extending air holes or drillings 108. The vaporizer carries a perforated sleeve 109, preferably having larger holes at the top than at the bottom and this sleeve is clamped in position by a ring 110 and bolts 111. The ring 110 is just the proper size to fit into the fire tube 30 and this tube is provided with a bead 112 to provide a stop for the ring. The ring is provided with perforations 113, shown more clearly in Figure 9, and carries upwardly extending rods 114 which support a flame spreading plate 115. The ring 110 also carries a downwardly and outwardly flaring skirt 116 which terminates just above the top of the vaporizer 106. The skirt compels the air to pass underneath it to where air is preheated. This skirt also acts to prevent flame from passing out through the sleeve 109 and up the tube 21. The bottom of the vaporizer 106 is covered by the cup shaped stamping 117 to provide an air space 118 and facilitate maintaining the vaporizer at a high temperature.

The unit B for the burner and fuel valve assembly is supported from the tube 21 by screws 119–119 which pass through holes in the tubes 21 and 30 and are threaded into ring 110 and by screws 120 which pass through holes in a bracket 121 welded to tube 21 and are threaded into the casting 70.

The bottom of the down draft tube 21 is closed off by a hemispherical stamping 122, which fits into the ring 123 carried by the bottom of the tube 21 and it is removably held in place by screws 124 threaded into ring 123. The casting 70 has a constriction as indicated at 125 which impedes the flow of heat lengthwise of the body member 70. As shown more clearly in Figure 5, the riser or air tube 107 receives a ring 126 which carries a number of fingers 127 of heat resistance wire of good thermal conducting material. These fingers extend up into the combustion space and carry heat down into the bottom of the vaporizer.

A lighting tube 130 is carried on the front side of the furnace and extends through down draft tube 21 and the fire tube 30. A cover 131 is pivoted on brackets 132 and urged to the open or to the closed position by a leaf spring 133, as indicated in Figures 12 and 13.

The air temperature responsive thermostatic apparatus for controlling the metering valve is shown generally at L and in Figures 5 and 11.

It includes a shaft 140 which extends through the upper air tube 28 and this shaft carries a bimetallic coiled thermostat 141. This shaft is carried on brackets 142, 142' secured to the front end plate 26 and the rear end plate 25 of the combustion drum. The front end of the shaft carries an adjusting arm 143 by which the thermostat may be adjusted. The rear end of the thermostat coil 141 is connected to a rotatable member 144, having arm 145 which normally engages a stop 146 when the thermostat is cold, see Figure 11. The member 144 is secured at 144' to a connecting rod 147 which extends downwardly. The lower end 148 of the connecting rod is secured to a slider 149 slotted at the top as indicated at 150 and passing about the support of the shaft 140. The lower end of the slider 149 passes through an opening 150" in the housing 20. This slider carries a bracket member 151 which extends down through another opening 152 in the housing 20.

The bracket 151 overlies the top of the metering valve stem 79 and this stem is provided with an adjusting nut 153 whereby the extent of the opening of the metering valve may be controlled when the arm 145 carried by thermostatically operated member 144 is held against the stop 146. In this way the flow for the starting fire is maintained. As the temperature of the combustion drum rises and the thermostat 141 becomes heated, it turns the element 144 in a clockwise direction, as viewed in Figure 11. This will cause the bracket 151 to move up away from the metering valve so that the metering valve will be moved to the maximum open position as determined by the high fire adjustment nut 94. Further expansion of the thermostat 141 will cause the pivot point 144' between parts 144 and 147 to pass over the center and then the parts 147, 148, 151 will move down. At the same time the stop arm 145 will pass around and approach the stop 154 shown in Figure 11.

The parts are preferably so constructed that the bracket 151 reengages the metering stem during the latter part of the down stroke of the slider 149 and it is therefore not until the temperature of the air in the air tube reaches this critical temperature that the flow of oil is diminished. As the temperature builds up the flow of oil is diminished but not to such an extent as to shut off the burner, for the parts are so constructed that the metering valve can not be closed by the operation of the thermostat 141. The stop 154 limits the movement of the parts operated by the thermostat 141 and does not permit the pivot point between the parts 147 and 144 to pass a lower dead center.

When the furnace is in continuous operation the thermostat 141 operates back and forth between the position where it permits high or maximum high fire operation and the position where it allows only pilot operation. The intensity of the fire, therefore, varies between the maximum and minimum, so that there is no likelihood of overheating the parts, or delivering the air at too high a temperature, or of extinguishment of the flame.

In the form shown in Figure 14 the shaft 140 carrying the bimetallic coiled thermostat 141 is provided with a yoke 155, and this yoke is connected through universal joint connections 156 with a shaft 157. This shaft extends out through a guide tube 158 carried by the discharge or air delivery cover 159 (similar to the cover H, but not hinged). The tube 158 carries a spring casing member 160 and an operating handle 161. The casing 160 can be secured to the shaft 157 in any desired position by a lock screw 162 and a spring 163 forces the handle 161 toward the walls of the cover 159. To keep the arm 161 in adjusted position it is provided with a boss 164 adapted to enter into selected openings around the axis of the shaft 157. When the device of Figure 14 is first assembled adjustments are made when the screw 162 is loose. The handle 161 is then placed in its proper positon and the screw 162 tightened, after which adjustments of the thermostat may be made at will to vary the temperature of the air delivered without disturbing any of the other parts of the device.

It will thus be seen that when the structure is cold or at ordinary room temperatures the extent of opening of the metering valve will be controlled by the adjustment of the stop mechanism for the air temperature responsive thermostat, and that when the starting lever 81 is moved to the starting position the fuel line will be opened to the float chamber, and fuel at a predetermined flow rate will pass down to the burner. This fuel will form a pool in the burner and must be immediately lighted. If for any reason the metering valve is allowed to remain open too long before the torch is supplied, the oil can flow from the vaporizer out through the tube 107 and escape through a drain hole 122' in the stamping 122. The lighting can be done by inserting a torch T (such as indicated in Figure 3) through the lighting tube 130. The fuel will be consumed in the burner and the natural draft caused by the combustion of the fuel will cause the products of combustion to pass up through the combustion drum, and air will be drawn in through the down draft tube 21. When the burner has been heated by natural draft sufficient to permit forced draft operation, the motor or engine may be started so as to operate the fan and blow air through the furnace and through the burner.

When the furnace is to be operated at extremely low temperatures such as 40° below zero the internal combustion engine for operating the fan can not be started by ordinary cranking methods, but it can be preheated by the present apparatus, using the apparatus as a temporary natural draft burner. During operation at natural draft the drum end wall is heated and it radiates heat toward the engine. For more quickly pre-heating the internal combustion engine, the entire furnace is preferably tilted, as indicated in Figure 4, to raise the rear end having the engine above the front or output end of the furnace as indicated by the dot-and-dash lines in the upper left-hand corner of Figure 4. The operation of the burner under natural draft will heat the combustion drum and the naturally induced air currents which pass through the air tubes 28 which extend through the combustion drum will cause ascending currents of warm air to pass by the internal combustion engine and warm it. Soon it can be started by the usual pulley and rope arrangement employed for such small engines, whereupon the burner will at once change over in its operation to forced draft.

The maximum combustion rate of the burner under either natural draft or forced draft is greater than the capacity of the metering valve to deliver fuel, so that there is no substantial accumulation of fuel in the vaporizer. The fuel which passes through the metering valve runs down through the tube 105 without filling it. The continued operation of the burner under forced draft will cause the combustion chamber to get hotter and the air in the air tubes to increase in temperature and this will bring about the heating of the air temperature control thermostat 141 so as to cause the metering valve controlling mechanism to move upwardly, so that the metering valve can open wider than it could when the apparatus was cold. This will increase the firing rate to an amount determined by the adjustment of nut 94. The further increase in temperature will merely shift the air temperature control thermostat 141 to bring the parts past dead center and the slider 149 back down toward the metering valve stem. When it engages the metering valve stem, it will start to close off the flow of fuel to the burner. The extent of closing movement of the metering valve will be insufficient to completely cut off the flow of fuel and extinguish the burner. The apparatus which has been shown herein for controlling the metering valve is one which normally moves the metering valve stem back and forth between low fire and a much higher fire.

The flow rate of a metering valve at any selected adjustment varies very widely over ranges of temperature from —40° F. to room temperatures so that an adjustment for the very low temperature would allow a great excess of fuel to flow at the higher ambient temperature. By having the metering valve move back and forth it is possible to have the maximum flow rate when operating for a high temperature rise of the air forced through the furnace and to rely on the thermostat to reduce the flow rate to the average amount needed.

At temperatures above about —20° F. gasoline and fuel oil are able to retain a small amount of water in what appears to be a solution, but below this temperature the water is thrown out of solution in the form of minute ice crystals, so small that they will not all be retained on the fine sieve in the strainer. Some of these crystals pass into the float chamber and tend to accumulate about the metering valve stem and to clog the orifice of the metering valve stem, especially when the stem is fixed. By moving the stem back and forth these crystals are crushed and pushed through the orifice. When the float chamber warms up the ice crystals melt so as to form small droplets of water. These tend to move toward the metering valve stem slot and are forced on through to the burner. Accumulation of water in the vaporizer is prevented by the hot rods or fingers 127.

The manipulations necessary for getting the furnace into operation include the pressing of the valve operating lever 65 to the open position pushing the starting lever 81 to the open position and opening the lighting tube cover 131 which place all the parts in position for operation and these manipulations can be done by a person wearing mittens, so that no part of the apparatus need be touched by the bare hand. The torch T which is usually carried in clips 165 can be ignited by dipping it into the fuel in the vaporizer withdrawing it and lighting it with a match after which it can be returned to the vaporizer to ignite the fuel in the vaporizer. The lighting of the match is the only operation which the operator need do bare handed. Where the electric motor is used a motor starting switch is employed and this can be operated with the mittened hand and where the internal combustion engine is used the starter rope can be wound in place by the operator with his mittens on. It will thus be seen that the furnace herein shown is very well adapted for controlling operation at extremely low temperatures without risking frost bite or unnecessary exposure to the cold. The emergency stopping of the furnace is effected by the bimetal safety and routine stopping by merely applying pressure to the trip lever 84. As this leaves fuel in the float chamber, it is preferable, where the furnace is to be carried to another location or stored for reuse to shut off the fuel by the valve 64 forming part of the strainer assembly J.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A hot air furnace comprising a horizontal cylindrical housing open at both ends so as to provide an air inlet and an air outlet, a blower adjacent the inlet end for blowing air lengthwise of the housing, a concentric combustion drum of smaller outside diameter than the housing so as to provide a space between the housing and drum, the drum having end walls interconnected by air tubes and carrying a downwardly extending fire tube adjacent the end wall near the blower and opening into the drum, the housing having a tube spaced outside the fire tube, the upper end of the outer tube closing off the space between the housing and drum on the portion of the tube remote from the blower only so that air is intercepted and directed downwardly between the downwardly extending tubes, a forced draft, liquid fuel burner below the fire tube and discharging products of combustion into the fire tube and the interior of the drum, means forming an air passage for conducting the intercepted air to supply it to the burner, and a stack connection from the combustion drum.

2. A furnace such as claimed in claim 1, wherein the end wall of the drum remote from the blower has a central aperture provided with a removable plug and the stack has a stack closure device whereby the products of combustion may be discharged through the stack or through the drum wall opening.

3. In a portable hot air heater, a supporting body comprising a horizontal tubular sheet metal housing split longitudinally to have a top half and a bottom half and open at both ends to provide an air inlet and an air outlet, supporting legs carried by the bottom half, a downwardly extending burner housing tube between the legs, a cylindrical heat interchanger drum received between the housing halves, the drum being shorter than the housing to leave one end of the housing open and having horizontal air tubes traversing the drum, and a fire tube concentric with the burner housing tube spaced within the burner housing tube and opening at its upper end into the drum, means forming an air passage leading from the open end of the horizontal housing into the burner housing tube, a stack connection extending from the drum through the housing, a fuel tank carried by the supporting body, a tank supplied, gravity fed, forced draft, liquid fuel burner having its supply side connected to the burner housing tube and discharging its products of combustion into the fire tube, and a blower mounted in the inlet end of the horizontal housing for blowing air through the horizontal tubes in the drum and the air passage to the burner housing to provide forced circulation through the air tubes in the drum and forced draft to the burner.

4. A hot air heater normally operated under forced draft and forced air circulation for extraneous heating and operable under natural draft without forced air circulation for self-preheating, comprising a fuel burner, a horizontal combustion drum above the burner and connected to the burner and having a stack opening, an outer horizontal housing open at both ends to provide for passage of air therethrough in either direction and spaced about the combustion drum and extending at one end beyond the end of the drum, a blower unit in said extended end, fresh air tubes extending through the drum, an inlet draft passage for the burner opening into the drum housing space to produce natural draft from the housing to the burner for fuel combustion whereby the natural draft combustion products passing through the drum will heat the drum and fresh air tubes to produce convection currents toward the blower unit for heating it, the inlet passage being located in front of the blower unit so that during blower operation the passage intercepts air from the blower unit to provide a forced draft and increases the combustion capacity, and the forced air circulated through the fresh air passages cool the drum and tubes when subjected to the higher heating caused by the increased fuel consumption.

5. A hot air heater normally operated under forced draft and forced air circulation for extraneous heating and operable under natural draft without forced air circulation for self-preheating, comprising a horizontal tubular housing open at its ends and a downwardly extending burner housing intermediate its ends, a fuel burner in the burner housing and having a substantial combustion capacity under natural draft and a greatly increased capacity under forced draft, a horizontal cylindrical combustion drum of smaller diameter than the horizontal housing to provide an annular space therebetween and having a fire tube near one end thereof extending down into the burner housing, a stack outlet for the combustion drum, the burner housing also extending upwardly across said annular space to the bottom of the drum except below the end of the drum toward the open end of the housing remote from the stack outlet to provide a down draft passage for air for the burner which passage opens under the end of the drum, a blower unit in the latter mentioned end of the horizontal housing for normally blowing air toward the adjacent said end of the drum and into the opening for the draft passage to provide forced draft, and through said annular space unoccupied by the burner housing for cooling the outside of the drum, the drum also having horizontal air tubes through which the blower unit blows air, the air tubes and the drum-housing space opening into the other end of the tubular housing, the heater when operating under natural draft conditions heating the end of the drum adjacent the blower unit hotter than the other end and bringing about a natural circulation of air from the combustion drum toward the blower unit to preheat it as well as the air taken in by natural draft, whereby the blower unit may be preheated and started so as to provide the forced draft and forced air circulation.

6. In a hot air furnace, a lower semi-cylindrical housing part open at both ends to provide an air inlet and an air outlet and having a downwardly extending tube substantially midway of its length, the side of the tube remote from the inlet end of the housing having a portion extending upwardly into the housing, a cylindrical combustion drum of smaller diameter than the housing part and downwardly receivable in said lower housing part with its lower wall engaging the upwardly extending portion of the tube to form a baffle across the space between the housing and drum, the drum having a fire tube concentric with and smaller than said tube to form an annular passage, a plurality of horizontally extending air tubes and a stack opening at the top, an upper semicylindrical housing part secured to the lower part about the drum and carrying a stack extending down into the stack opening in the drum, a burner carried by the outer tube under the fire tube and discharging the products of combustion through the fire tube into the drum, and a blower in the inlet end of the housing for forcing air through the air tubes, the annular passage and into the burner, and for forcing the products of combustion through the fire tube, the interior of the drum and the stack.

7. A hot air furnace comprising a horizontal tubular housing having an inlet end and an outlet end, a power operated fan received in the inlet end of the housing for blowing air towards the outlet end of the housing, a drum having an outer wall spaced from the housing wall, and disposed toward the outlet end of the housing, the drum having spaced end walls connected by peripherally disposed horizontal air tubes whereby the air blown by the fan escapes through the air tubes and the drum-housing space, a short fire tube extending downwardly from the drum through the bottom of the housing and disposed at the end of the drum near an inlet end of the housing, a burner below the tube and discharging flame and hot products of combustion into the fire tube and drum, means for intercepting a portion of the air forced through the drum-housing space and for conducting it to the burner to afford forced draft, and a stack extending from the top of the outlet end of the drum through the top of the housing.

8. A hot air furnace as claimed in claim 7, having a perforated flame impingement baffle of inverted channel shape between the air tubes and the discharge end of the fire tube.

9. A hot air furnace as claimed in claim 7, having a plug insertible in the stack and a removable closure for an opening in the end wall of the drum adjacent the stack, whereby the products of combustion may escape through the opening.

10. A hot air furnace as claimed in claim 7, wherein the discharge end of the drum has a central opening to allow escape of products of combustion to mix with the fresh air coming through the tubes and drum-housing space, and a deflector for spreading the discharged combustion gases to mix them with the fresh air.

RALPH W. DE LANCEY.

REFERENCES CITED

The following references are of record in the file of this patent:

UNITED STATES PATENTS

| Number | Name | Date |
|---|---|---|
| 1,047,331 | Sweet | Dec. 17, 1912 |
| 1,154,106 | Ephriam | Sept. 21, 1915 |
| 1,359,871 | Clark | Nov. 23, 1920 |
| 1,375,664 | Austin | Apr. 26, 1921 |
| 1,448,985 | Yewell | Mar. 20, 1923 |
| 1,556,817 | Higgins | Oct. 13, 1925 |
| 1,651,668 | Burmester | Dec. 6, 1927 |
| 1,729,202 | Blomfeldt | Sept. 24, 1929 |
| 1,778,437 | Valjean | Oct. 14, 1930 |
| 1,871,008 | Rentz | Aug. 9, 1932 |
| 2,151,001 | Andersson | Mar. 21, 1939 |
| 2,186,128 | Ollstrand | Jan. 9, 1940 |
| 2,231,445 | Grapp | Feb. 11, 1941 |
| 2,295,177 | King | Sept. 8, 1942 |
| 2,299,901 | Johnston | Oct. 27, 1942 |

FOREIGN PATENTS

| Number | Country | Date |
|---|---|---|
| 264,282 | Great Britain | Jan. 20, 1927 |
| 278,474 | Great Britain | Oct. 13, 1927 |
| 751,054 | France | June 12, 1933 |
| 792,533 | France | Oct. 21, 1935 |